(12) United States Patent
Haworth et al.

(10) Patent No.: US 11,119,632 B2
(45) Date of Patent: Sep. 14, 2021

(54) SYSTEMS AND METHODS FOR PROACTIVE ANALYSIS OF ARTIFACTS ASSOCIATED WITH INFORMATION RESOURCES

(71) Applicant: Mimecast Services Ltd., London (GB)

(72) Inventors: Lee Haworth, London (GB); Simon Paul Tyler, Wiltshire (GB); Jackie Anne Maylor, Wiltshire (GB); Nathaniel S. Borenstein, Greenbush, MI (US)

(73) Assignee: Mimecast Services Ltd., London (GB)

( * ) Notice: Subject to any disclaimer, the term of this patent is extended or adjusted under 35 U.S.C. 154(b) by 400 days.

(21) Appl. No.: 16/239,508

(22) Filed: Jan. 3, 2019

(65) Prior Publication Data

US 2019/0204996 A1     Jul. 4, 2019

Related U.S. Application Data

(60) Provisional application No. 62/613,189, filed on Jan. 3, 2018.

(51) Int. Cl.
| | | |
|---|---|---|
| *H04L 29/06* | (2006.01) | |
| *G06F 3/0482* | (2013.01) | |
| *G06F 21/44* | (2013.01) | |
| *G06F 3/0481* | (2013.01) | |
| *G06F 21/56* | (2013.01) | |

(52) U.S. Cl.
CPC ........ *G06F 3/0482* (2013.01); *G06F 3/04817* (2013.01); *G06F 21/44* (2013.01); *G06F 21/56* (2013.01)

(58) Field of Classification Search
CPC .... G06F 3/0482; G06F 3/04817; G06F 21/44; G06F 21/50; G06F 21/56; G06F 21/62; H04L 63/1416; H04L 63/1433; H04L 63/145

See application file for complete search history.

(56) References Cited

U.S. PATENT DOCUMENTS

| | | | |
|---|---|---|---|
| 6,965,968 B1 | 11/2005 | Touboul | |
| 7,058,822 B2 | 6/2006 | Edery et al. | |
| 7,418,731 B2 | 8/2008 | Touboul | |
| 7,647,633 B2 | 1/2010 | Edery et al. | |
| 8,037,527 B2* | 10/2011 | Milener | H04L 63/1416 |
| | | | 726/22 |
| 8,082,576 B2* | 12/2011 | Flynn | H04L 63/20 |
| | | | 726/5 |
| 8,141,154 B2 | 3/2012 | Gruzman et al. | |
| 8,327,440 B2* | 12/2012 | Milener | H04L 63/1433 |
| | | | 726/22 |

(Continued)

*Primary Examiner* — Hosuk Song
(74) *Attorney, Agent, or Firm* — Nutter McClennen & Fish LLP (57) ABSTRACT

The invention is related to security systems and methods for proactively informing a user about an artifact associated with a clickable object on a user interface with which the user is interacting, where such information is provided to the user prior to selection of the clickable object. The information includes a safety assessment of the clickable object, details about the underlying artifact, such as the contents of an archive file, and general information helpful in assisting the user with making a decision as to whether to select the clickable object.

21 Claims, 8 Drawing Sheets

(56) References Cited

U.S. PATENT DOCUMENTS

| | | | |
|---|---|---|---|
| 8,516,439 B2 * | 8/2013 | Brass | G06T 11/206 717/109 |
| 8,856,869 B1 * | 10/2014 | Brinskelle | G06F 21/6218 726/2 |
| 9,398,029 B2 * | 7/2016 | Sadeh-Koniecpol | G06F 21/56 |
| 10,277,628 B1 | 4/2019 | Jakobsson | |
| 10,609,073 B2 | 3/2020 | Jakobsson | |
| 2005/0114778 A1 * | 5/2005 | Branson | G06F 9/453 715/711 |

\* cited by examiner

Dear Credulous Fool,

I am writing to tell you that if you simply click on this link: ← 401

I-swear-this-is-a-harmless-link ← 402

You will be showered with untold riches. Also, as if that weren't enough, I'm enclosing a file with my secret recipe for egg salad:

← 403

Yours truly,

The King of Nigeria

FIG. 7A
An Archive File Shown in a Finder (File Manager) Window

FIG. 7B
Information About the Archive File Shown by Hovering

FIG. 8

SYSTEMS AND METHODS FOR PROACTIVE ANALYSIS OF ARTIFACTS ASSOCIATED WITH INFORMATION RESOURCES

CROSS-REFERENCE TO RELATED APPLICATIONS

This application claims the benefit of, and priority to, U.S. Provisional Application No. 62/613,189, filed Jan. 3, 2018, the content of which is hereby incorporated by reference herein in its entirety.

FIELD

The present disclosure relates generally to Internet security and human-computer interaction, and, more particularly, to systems and methods for assisting a user in avoiding potential security breaches, including phishing and impersonation, malware, and domain name security issues.

BACKGROUND

The Internet is the global system of interconnected computer networks, consisting of private, public, academic, business, and government networks of local to global scope, linked by a broad array of electronic, wireless, and optical networking technologies. The Internet carries a vast range of information resources and services, and is a critical part of the communications infrastructure of the world. However, the Internet also represents an insecure channel for exchanging information leading to a high risk of intrusion or fraud. As such, it is important for individual users and enterprises to utilize some form of Internet security in order to decrease the risk of data breaches as a result of such threats.

One type of threat involves a form of domain name impersonation or masquerading. For example, by way of background, interconnected computers exchange information using various services, such as electronic mail, Gopher, and the World Wide Web ("WWW"). The WWW service allows a server computer system (i.e., Web server or Website) to send graphical Web pages of information to a remote client computer system. The remote client computer system can then display the Web pages. Each resource (e.g., computer or Web page) of the WWW is uniquely identifiable by a Uniform Resource Locator ("URL"). In order to view a specific Web page, a client computer system specifies the URL for the Web page in a request (e.g., a HyperText Transfer Protocol ("HTTP") request), which generally follow the familiar format http://www.xxx.com, uniquely identifying the particular resource. The request is then forwarded to the Web server that supports that Web page to the client computer system. Upon receiving the web page, the client computer system displays the Web page using a browser. Generally, a Web page's address or URL is made up of the name of the server along with the path to the file or the server. Rather than using a Web hosting service's server name as their URL, most companies and many individuals and other entities prefer a "domain name" of their own choosing. In other words, Google would likely prefer its Google Web Search engine to have the domain name of "http://www.google.com" as its URL rather than, "http://servername.com/~google", where "servername" is the name of a Web hosting service whose server Google uses.

Malicious actors on the Internet often try to fool users into thinking that they are interacting with known, trusted entities. When a malicious actor garners some amount of trust from the user, such trust may be exploited to the detriment of the user. For example, domain name impersonation or masquerading is a technique in which a domain name of a trusted entity, which would normally direct to a legitimate and trusted Web page or content, has been altered in such a manner that an internet user can be fooled into believing that the altered domain name is associated with the trusted entity. However, clicking the altered domain name may instead cause downloading of software (or allow other forms of entry) that is of malicious intent, such as phishing, online viruses, Trojan horses, worms, and the like.

For example, a domain name may be altered by one or more characters, but may still visually appear to be associated with the trusted party, thereby tricking an internet user into believing that it is authentic. A user is more likely to click on an altered link if said user believes that the link is associated with a trusted party. For example, the domain name "www.citibank.com" may be altered by one or more characters to form a masquerading domain name, such as "www.cit1bank.com", and may invite trust from a customer of the trusted party (i.e., Citibank), despite the change of the "i" to a "1" in the domain name. Similarly, email falsely purporting to be from Mimecast (the trusted company) will be more believable with a return address of "@mrncast.com", than with a generic "@yahoo.com". Additionally, a masquerading domain name may use the correct characters or word of the trusted domain name, but may include such characters or words in a different order, such as, for example, "mimecast.nl", which is not registered or associated with the trusted entity. The detection of such subtleties in domain names can be especially difficult, thereby presenting a challenge for current security systems.

SUMMARY

The present invention is directed to security systems and methods for assisting a user in avoiding potential security breaches when interacting with their computing device, particularly when the user is browsing a web page, emails, documents, or other forms of content displayed on a user interface of the device. Such forms of content (i.e., web pages, emails, documents, etc.) may include clickable objects, such as a link, icon, attachment, or other representation of an information resource. Computer users are often faced with the opportunity to select a link or icon with the thought that clicking on such links or icons will lead to some intended event to occur, such as redirecting a user to a safe web page or downloading of a safe file (i.e., web pages or files that do not pose security threats). However, in some instances, the links or icons may have been designed to fool the user into thinking they are trusted and safe, but in reality, such links or icons actually cause serious harm once selected, as such links or icons may cause phishing and impersonation, malware, and/or domain name security issues.

The system of the present disclosure monitors user interaction with their computing device, such as interaction with a web page or email containing a clickable object. The clickable object may include, for example, a hyperlink, icon, attachment, or other representation of an information resource. The system monitors hover or mouseover events relative to the clickable object provided in the content being viewed. The term hover or mouseover refers to the user action of positioning a pointing device (e.g., cursor of an input device, such as a mouse cursor or pointer) over a visual item (i.e., a clickable link or icon) on the user interface display for a pre-determined length of time. In other words, the user may hover the cursor over the clickable object, rather than actually clicking on the object. As such, the mouseover does not require the activation of a selection input.

It should be noted that some computing devices employ touchscreen interfaces that do not necessarily include a visual cursor or pointer, but rather sense physical touch with the screen as a means of interacting with the user interface for selection of clickable objects. As such, a mouseover event may also include user interaction with a clickable object in which the user may hold their finger (or stylus) upon a clickable object for a pre-determined length of time.

The system is configured to detect a hover or mouseover event and perform a preliminary analysis on an underlying artifact associated with the clickable link or icon associated with the hover or mouseover event. In particular, the system is configured to analyze the artifact in real time, or near-real time, to determine whether the artifact poses a security risk. Upon analyzing the artifact, the system is configured to present information about the clickable object on the user interface display, wherein such information includes a safety assessment of the clickable object, details about the underlying artifact, such as the contents of an archive file, and general information helpful in assisting the user with making a decision as to whether to select the clickable object. As such, the information may be as simple as providing the contents of a ZIP archive, or as complex as analyzing the information resource for potential security issues.

In one aspect, the present invention provides a system for proactively providing a user with information associated with an information resource in advance of user selection and viewing of the information resource. The system includes a processor coupled to a memory containing instructions executable by the processor to cause the system to monitor user interaction with a user interface of a computing device displaying content, detect a hover event corresponding to user input with the user interface, the user input comprising positioning of a selection input proximate to a visual representation of an information resource for a predetermined period of time, analyze one or more underlying artifacts associated with the information resource, and output to the user, via the user interface, information associated with the information resource based on analysis of the one or more underlying artifacts. In some embodiments, outputting the information comprises displaying, on the user interface, a pop-up icon providing information associated with the information resource.

In some embodiments, the information associated with the information resource comprises a safety assessment of the information resource. For example, the safety assessment may generally include an indication whether the information resource contains viruses or other malware. In some embodiments, the safety assessment may include an indication whether a claimed provenance or authorship of the information resource appears to be valid. Accordingly, the safety assessment of the information resource may further include an indication of whether the information resource is safe or potentially harmful if selected and viewed from a security standpoint. As such, the information associated with the information resource may further comprise a recommended action that the user take based on the safety assessment. In other words, the user may be advised to not click on the link, icon, or other visual representation associated with the information resource and may further be advised to contact their IT department or the like.

In some embodiments, the information associated with the information resource informs the user of whether the information resource is an executable program for a platform other than a platform associated with the computing device and in use. Yet still, in some embodiments, the information associated with the information resource comprises a listing of contents of a multipart information resource. The multipart information resource may include a file archive, for example. In some embodiments, the information associated with the information resource informs the user of whether the information resource comprises adult-oriented material. In some embodiments, the visual representation is a link and the information associated with the information resource indicates whether the link redirects to a different link. In some embodiments, the information associated with the information resource informs the user of whether the information resource comprises material distributed without legal permission. For example, the information may inform the user of whether the information resource comprises copyright violations. In some embodiments, the information associated with the information resource informs the user of whether the information resource comprises sensitive information that the user should not view, wherein the sensitive information comprises at least one of health care information and national security information. In some embodiments, the information associated with the information resource informs the user of whether the information resource is forbidden by a policy of the user's employer.

In some embodiments, the visual representation of the information resource is a selectable object comprising a link, an icon, an attachment, or other visual representation of an information resource. In some embodiments, the visual representation is an email address, and the information associated with the information resource comprises one or more aspects of a reputation of the email address.

In other embodiments, the visual representation of the information resource is a link associated with a domain. In such an instance, the system is further configured to maintain a database with a plurality of trusted domains, analyze the domain associated with the link upon detecting a hover event associated with the link. Analysis of the domain may include comparing the domain with the plurality of trusted domains, correlating metadata of the domain with metadata of the at least one trusted domain if the domain is determined to be similar to at least one of the trusted domains, and flagging the domain as being legitimate or flagging the domain as being illegitimate based on the correlation. The domain is flagged as being legitimate based on a positive correlation and the domain is flagged as being illegitimate based on a negative correlation. In some embodiments, the metadata is stored in a domain name system (DNS). Accordingly, in some embodiments, the security system of the present disclosure is configured to provided domain name authentication by analyzing a domain name, specifically DNS metadata associated with the domain name, in order to determine whether the domain name is legitimate, and thus provides an indication to the user that the web page or content associated with the domain name is trusted or provides an indication that the web page or content associated with the domain name is potentially harmful and presents a security risk if the domain name has been created with the intent to impersonate a legitimate domain name and thus fool the user into believing that the masquerading domain name is associated with a trusted entity or party.

The system is configured to analyze most, if not all, DNS metadata provided by the DNS system for a given domain under inspection, including, but not limited to, the registrar of the domain, the IP addresses of Mail Exchanger (MX) records, DomainKeys Identified Mail (DKIM) records, and other service addresses beyond Simple Mail Transfer Protocol (SMTP), Internet Message Access Protocol (IMAP), and Post Office Protocol (POP). The system is further configured to utilize other data associated with the domain name under inspection, such as behavioral attributes of the trusted entity or party, including, but not limited to, server software in use and policies the entity or party enforces. For example, WHOIS, the query and response protocol, may be widely used for querying databases that store the registered users or assignees of an Internet resource, such as a domain name, an IP address block or an autonomous system.

Accordingly, the security system of the present disclosure is configured to proactively inform a user about potential security threats associated with a clickable object prior to the user selecting the object and risking harm to their computing device and network. As such, in the event that harmful content slips past filters at the time of delivery (e.g., email), the security system of the present disclosure provides an additional layer of security configured to inform a user of the potentially harmful content, in advance of the user interacting with such content (i.e., selecting the clickable link or icon so as to view, activate, open, or download the content).

BRIEF DESCRIPTION OF THE DRAWINGS

Features and advantages of the claimed subject matter will be apparent from the following detailed description of embodiments consistent therewith, which description should be considered with reference to the accompanying drawings.

For a thorough understanding of the present disclosure, reference should be made to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient.

DETAILED DESCRIPTION

By way of overview, the present invention is directed to security systems and methods for assisting a user in avoiding potential security breaches when interacting with their computing device, particularly when the user is browsing a web page, emails, documents, or other forms of content displayed on a user interface of the device. Such forms of content (i.e., web pages, emails, documents, etc.) may include clickable objects, such as a link, icon, attachment, or other representation of an information resource. Computer users are often faced with the opportunity to select a link or icon with the thought that clicking on such links or icons will lead to some intended event to occur, such as redirecting a user to a safe web page or downloading of a safe file (i.e., web pages or files that do not pose security threats). However, in some instances, the links or icons may have been designed to fool the user into thinking they are trusted and safe, but in reality, such links or icons actually cause serious harm once selected, as such links or icons may cause phishing and impersonation, malware, and/or domain name security issues.

The present disclosure provides a security system configured to monitor user interaction with a web page, email, document, or other forms of content displayed on a user interface of a computing device and detect a user hover or mouseover event relative to a clickable object (i.e., a link, icon, or the like) provided in the content being viewed. The system is further configured to perform a preliminary analysis on an underlying artifact associated with the clickable link or icon (upon which the hover or mouseover event is occurring) and present information about the clickable object on the user interface display. The presented information includes, but is not limited to, a safety assessment of the clickable object, details about the underlying artifact, such as the contents of an archive file, and general information helpful in assisting the user with making a decision as to whether to select the clickable object.

Accordingly, the security system of the present disclosure is configured to proactively inform a user about potential security threats associated with a clickable object prior to the user selecting the object and risking harm to their computing device and network. As such, in the event that harmful content slips past filters at the time of delivery (e.g., email), the security system of the present disclosure provides an additional layer of security configured to inform a user of the potentially harmful content, in advance of the user interacting with such content (i.e., selecting the clickable link or icon so as to view, activate, open, or download the content).

Figure 1:
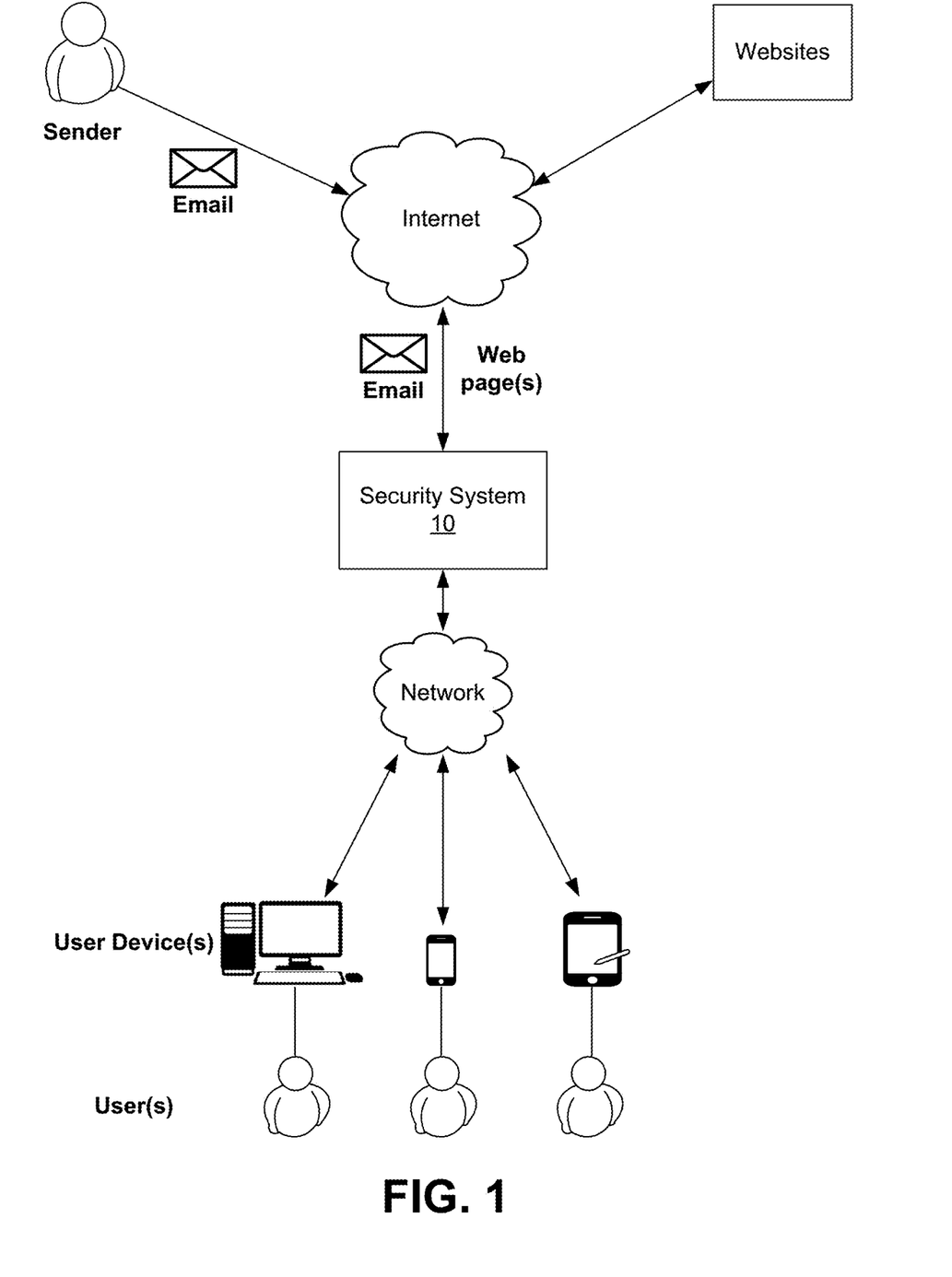
FIG. 1 is a block diagram illustrating a security system consistent with the present disclosure.

FIG. 1 is a block diagram illustrating a security system 10 consistent with the present disclosure. The security system 10 is configured to assist a user in avoiding potential security breaches when interacting with their computing device, particularly when the user is browsing a web page, emails, documents, or other forms of content displayed on a user interface of the device. Such forms of content (i.e., web pages, emails, documents, etc.) may include clickable objects, such as a hyperlink, icon, attachment, or other representation of an information resource.

The system 10 is configured to monitor user interaction with their computing device, which generally includes detecting hover or mouseover events relative to a clickable object provided in the content being viewed. The term hover or mouseover refers to the user action of positioning a pointing device (e.g., cursor of an input device, such as a mouse cursor or pointer) over a visual item (i.e., a clickable link or icon) on the user interface display for a pre-determined length of time. In other words, the user may hover a mouse cursor over the clickable object, rather than actually clicking on the object. As such, the mouseover does not require the activation of a selection input (i.e., user selecting the hyperlink so as to be directed to the associated domain or selecting an attachment so as to download the associated file). It should be noted that some computing devices employ touchscreen interfaces that do not necessarily include a visual cursor or pointer, but rather sense physical touch with the screen as a means of interacting with the user interface for selection of clickable objects. As such, a hover or mouseover event may also include user interaction with a clickable object in which the user may hold their finger (or stylus) upon the visual rendering of the clickable object for a pre-determined length of time, wherein the system 10 will recognize such interaction as a hover event.

The system 10 is then configured to perform a preliminary analysis on an underlying artifact associated with the clickable link or icon associated with the hover or mouseover event. In particular, the system 10 is configured to analyze the artifact in real time, or near-real time, to determine whether the artifact poses a security risk. Upon analyzing the artifact, the system 10 is configured to present information about the clickable object on the user interface display of the user device, wherein such information includes a safety assessment of the clickable object, details about the underlying artifact, such as the contents of an archive file, and general information helpful in assisting the user with making a decision as to whether to select the clickable object.

The system 10 of the present invention may be embodied anywhere a domain name is available for inspection. In particular, this may include, but is not limited to, email readers or web browsers inspecting links that are presented to the user, and the like. The system 10 of the present invention may also be embodied in web proxies, or in servers, relays, or proxies for any end-user facing service, such as chat, telephony, video communication, and social networking systems.

Figure 2:
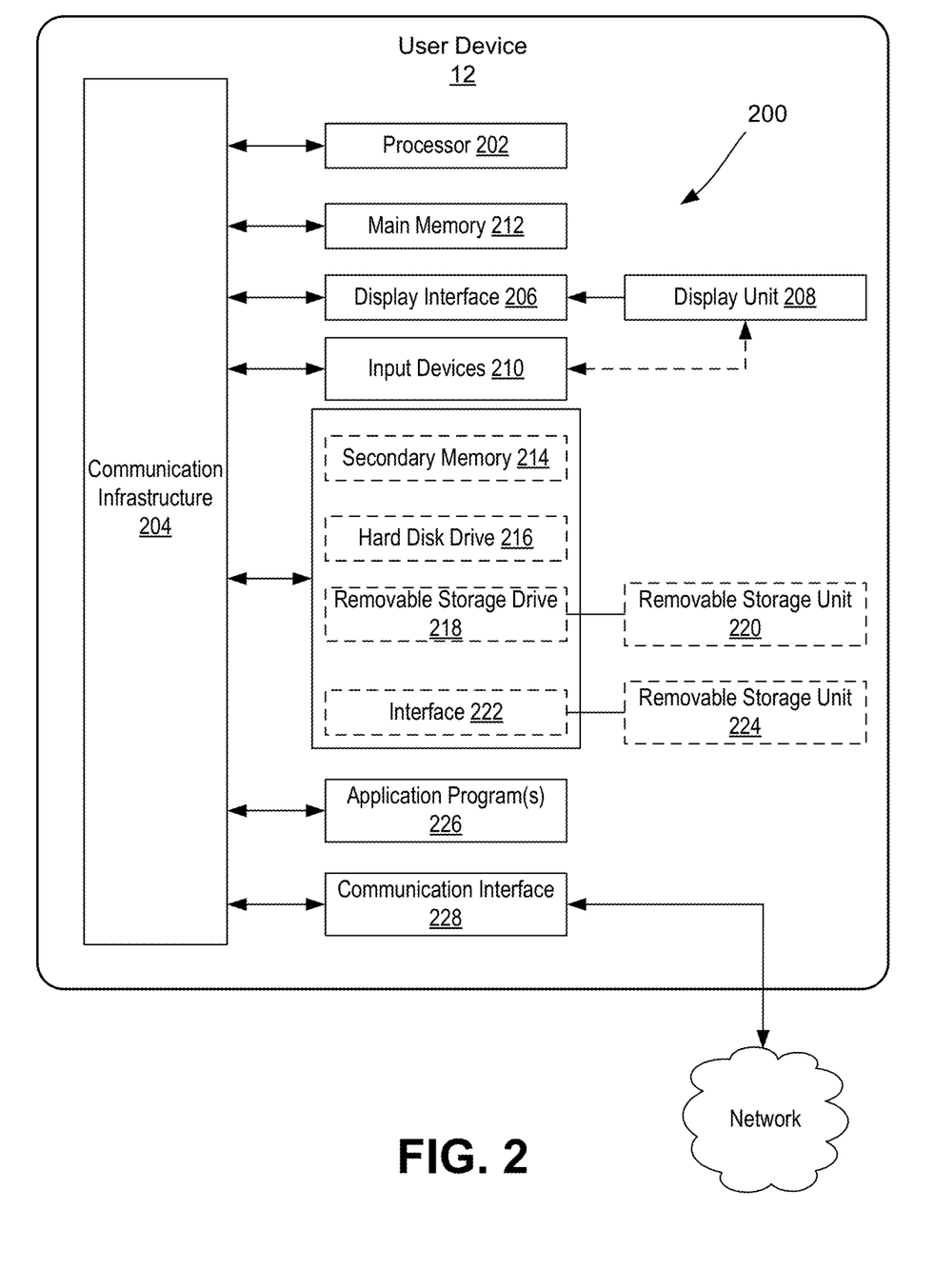
FIG. 2 is a block diagram illustrating at least one embodiment of a user device.

FIG. 2 is a block diagram illustrating at least one embodiment of a user device 12 for communicating with the security system 10 of the present disclosure. The user device 12 generally includes a computing system 200. As shown, the computing system 200 includes one or more processors, such as processor 202. Processor 202 is operably connected to communication infrastructure 204 (e.g., a communications bus, cross-over bar, or network). The processor 202 may be embodied as any type of processor capable of performing the functions described herein. For example, the processor may be embodied as a single or multi-core processor(s), digital signal processor, microcontroller, or other processor or processing/controlling circuit.

The computing system 200 further includes a display interface 206 that forwards graphics, text, sounds, and other data from communication infrastructure 204 (or from a frame buffer not shown) for display on display unit 208. The computing system further includes input devices 210. The input devices 210 may include one or more devices for interacting with the user device 12, such as a keypad, mouse, trackball, microphone, camera, as well as other input components, including motion sensors, and the like. In one embodiment, the display unit 208 may include a touch-sensitive display (also known as "touch screens" or "touchscreens"), in addition to, or as an alternative to, physical push-button keyboard or the like. The touch screen may generally display graphics and text, as well as provides a user interface (e.g., but not limited to graphical user interface (GUI)) through which a user may interact with the user device 12, such as accessing and interacting with applications executed on the device 12, including an app for providing direct user input with the denture monitoring service offered by the denture management platform.

The computing system 200 further includes main memory 212, such as random access memory (RAM), and may also include secondary memory 214. The main memory 212 and secondary memory 214 may be embodied as any type of device or devices configured for short-term or long-term storage of data such as, for example, memory devices and circuits, memory cards, hard disk drives, solid-state drives, or other data storage devices. Similarly, the memory 212, 214 may be embodied as any type of volatile or non-volatile memory or data storage capable of performing the functions described herein.

In the illustrative embodiment, the user device 12 may maintain one or more application programs, databases, media and/or other information in the main and/or secondary memory 212, 214. The secondary memory 214 may include, for example, a hard disk drive 216 and/or removable storage drive 218, representing a floppy disk drive, a magnetic tape drive, an optical disk drive, etc. Removable storage drive 218 reads from and/or writes to removable storage unit 220 in any known manner. The removable storage unit 220 may represents a floppy disk, magnetic tape, optical disk, etc. which is read by and written to by removable storage drive 218. As will be appreciated, removable storage unit 220 includes a computer usable storage medium having stored therein computer software and/or data.

In alternative embodiments, the secondary memory 214 may include other similar devices for allowing computer programs or other instructions to be loaded into the computing system 200. Such devices may include, for example, a removable storage unit 224 and interface 222. Examples of such may include a program cartridge and cartridge interface (such as that found in video game devices), a removable memory chip (such as an erasable programmable read only memory (EPROM), or programmable read only memory (PROM)) and associated socket, and other removable storage units 224 and interfaces 222, which allow software and data to be transferred from removable storage unit 224 to the computing system 200.

The computing system 200 further includes one or more application programs 226 directly stored thereon. The application program(s) 226 may include any number of different software application programs, each configured to execute a specific task.

The computing system 200 further includes a communications interface 228. The communications interface 228 may be embodied as any communication circuit, device, or collection thereof, capable of enabling communications between the user device 12 external devices. The communications interface 228 may be configured to use any one or more communication technology and associated protocols, as described above, to effect such communication. For example, the communications interface 228 may be configured to communicate and exchange data with the security system 10, as well as web sites and further receive email messages from one or more senders via a wireless transmission protocol including, but not limited to, Bluetooth communication, infrared communication, near field communication (NFC), radio-frequency identification (RFID) communication, cellular network communication, the most recently published versions of IEEE 802.11 transmission protocol standards as of January 2019, and a combination thereof. Examples of communications interface 228 may include a modem, a network interface (such as an Ethernet card), a communications port, a Personal Computer Memory Card International Association (PCMCIA) slot and card, wireless communication circuitry, etc.

Computer programs (also referred to as computer control logic) may be stored in main memory 212 and/or secondary memory 214 or a local database on the user device 12. Computer programs may also be received via communications interface 228. Such computer programs, when executed, enable the computing system 200 to perform the features of the present invention, as discussed herein. In particular, the computer programs, including application programs 226, when executed, enable processor 202 to perform the features of the present invention. Accordingly, such computer programs represent controllers of computer system 200.

In one embodiment where the invention is implemented using software, the software may be stored in a computer program product and loaded into the computing system 200 using removable storage drive 218, hard drive 216 or communications interface 228. The control logic (software), when executed by processor 202, causes processor 202 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

Figure 3:
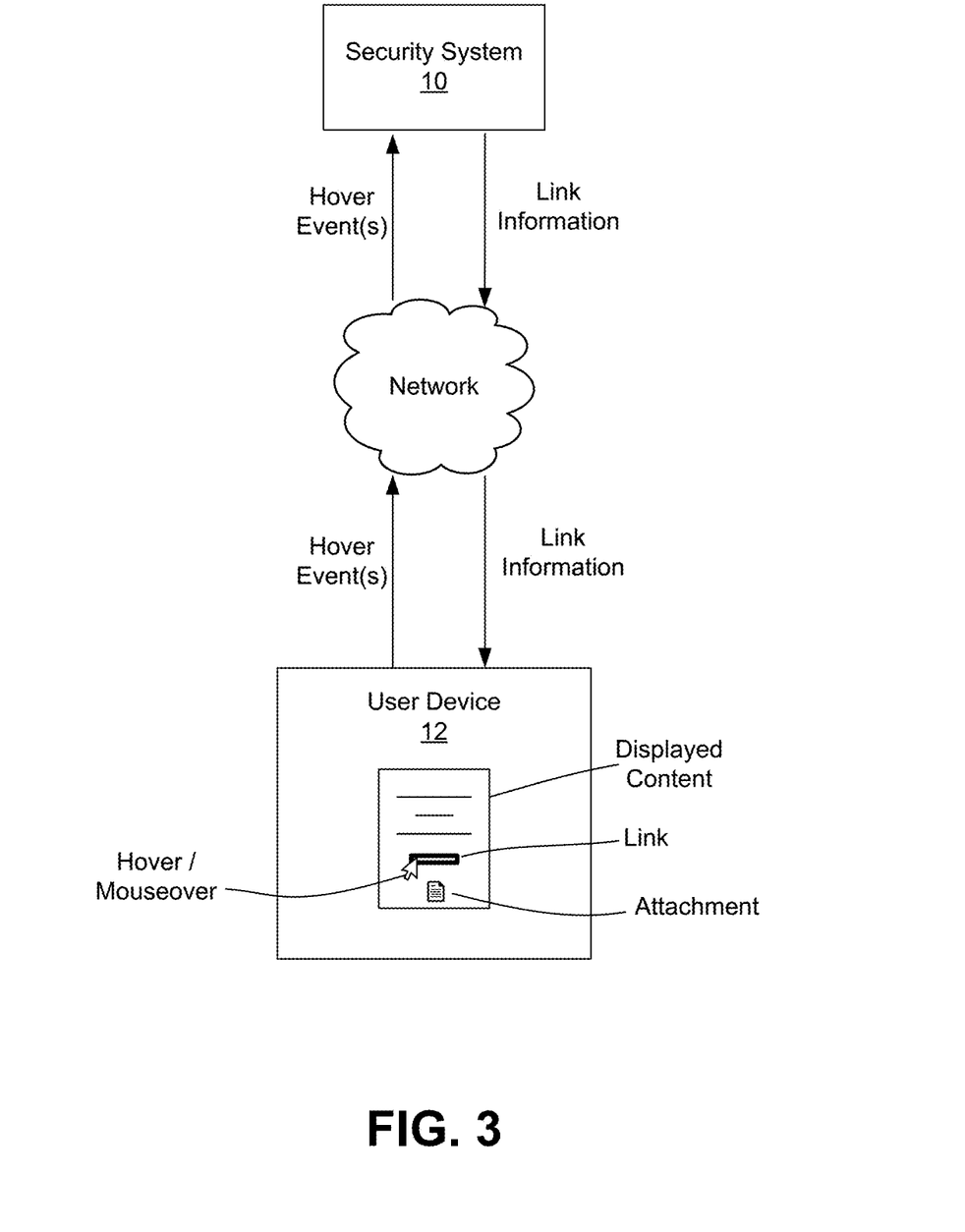
FIG. 3 is a block diagram illustrating communication between the user device and security system.

FIG. 3 is a block diagram illustrating communication between the user device 12 and security system 10. As illustrated, a user may be viewing a web page, email message, or other displayed content on the user device 12. Upon hovering a mouse cursor over a hyperlink, for example, the system 10 is configured to detect such a hover or mouseover event and, in turn, perform a preliminary analysis on an underlying artifact associated with the hyperlink. Upon performing analysis, the system 10 is configured to present information about the link on the user interface display of the user device 12, wherein such information may include, but is not limited to, a safety assessment of the link, details about the underlying artifact, such as the contents of an archive file, and general information helpful in assisting the user with making a decision as to whether to select the link. Accordingly, the system 10 proactively provides a user with information associated with an information resource (i.e., content associated with a clickable link, icon, attachment, or the like) in advance of user selection and viewing of the information resource. The system 10 includes a processor coupled to a memory containing instructions executable by the processor to cause the system 10 to monitor user interaction with a user interface of their computing device 12 displaying content, which may be in the form of a web page, email message, document, or other content. In particular, the system 10 is configured to detect a hover event corresponding to user input with the user interface of the device 12. The user input comprises positioning of a selection input proximate to a visual representation of an information resource for a predetermined period of time. The visual representation includes, for example, a selectable object comprising a link, an icon, an attachment, or other visual representation of an information resource.

The system 10 is configured to analyze one or more underlying artifacts associated with the information resource, and output to the user, via the user interface, information associated with the information resource based on analysis of the one or more underlying artifacts. In some embodiments, outputting the information comprises displaying, on the user interface, a pop-up icon providing information associated with the information resource (shown in FIGS. 5, 6, and 7B).

For example, as will be described in greater detail herein, the system 10 provides improved domain name authentication by analyzing a domain associated with a hyperlink included in a message received by a user. The message may be an email message from a sender to one or more email recipients. The system 10 is configured to analyze a domain associated with the hyperlink within the email message, upon detecting a hover or mouseover event, in order to determine whether the domain is authentic and associated with a trusted entity or party (i.e., determine legitimacy of the domain to ensure that said email message does not contain a threat). However, it should be noted that, in other embodiments, analysis of one or more underlying artifacts associated with the information resource may include comparing such artifact with databases containing up-to-date information concerning known security threats. For example, the system 10 may be configured to query publicly available databases or repositories that provide known viruses, malware, and threats, and further correlate the underlying artifacts with known security threats to determine the safety of the information resource.

Figure 4:
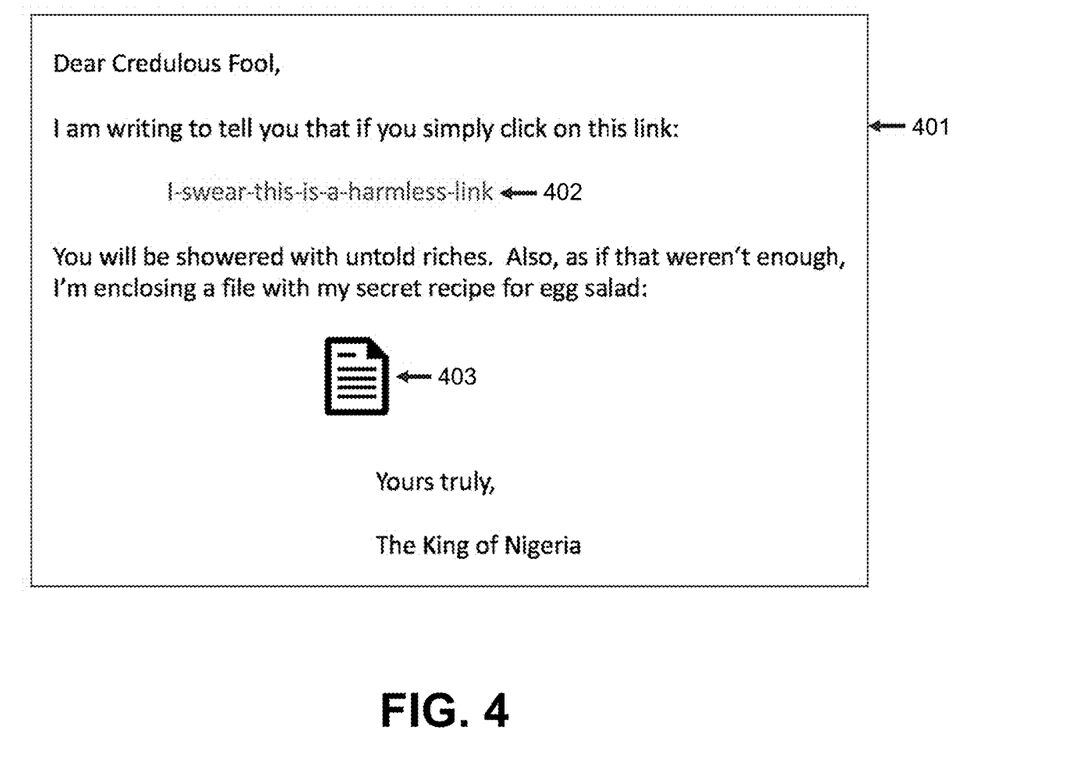
FIG. 4 illustrates an email message displayed on a user device.

FIG. 4 shows an email message 101 being displayed to a user. The message 401 includes a link 402, indicated by the text "I-swear-this-is-a-harmless-link." Of course, this text may be misleading as the actual link (URL) is not visible to the user. The message further includes a file attachment 403, which may or may not have any indicator of its contents, such as file name or type.

Figure 5:
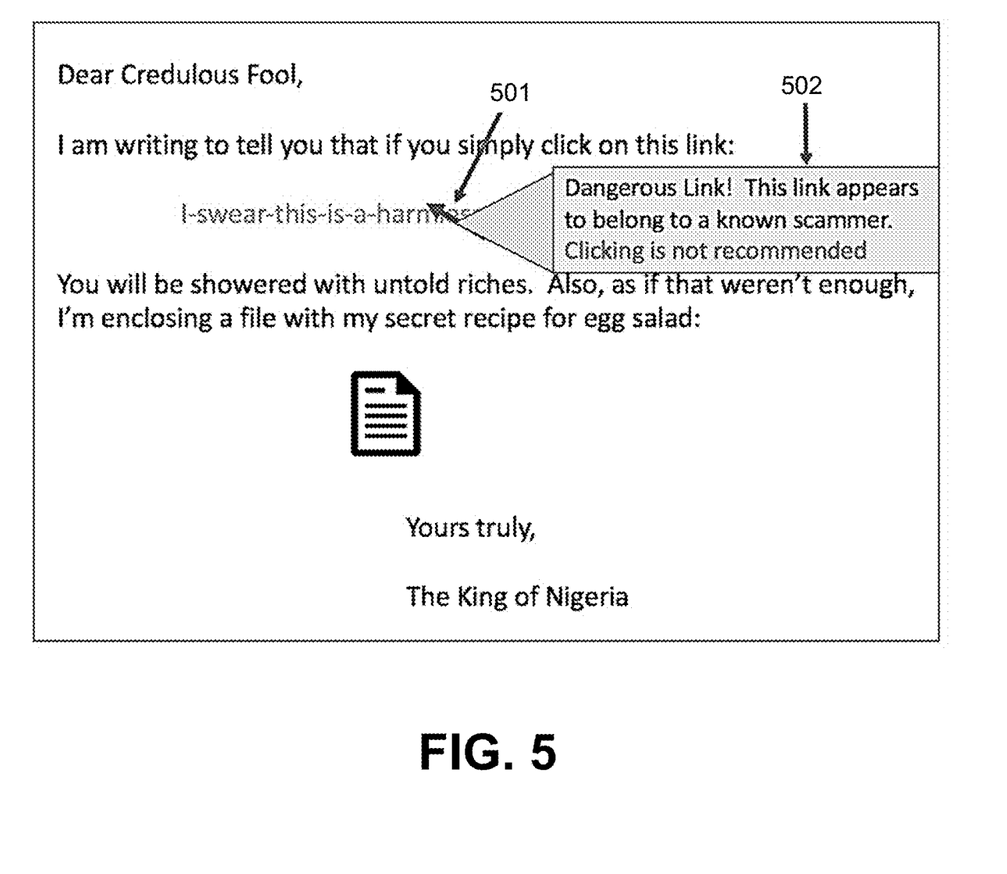
FIG. 5 illustrates a hover event in which the user hovers a mouse cursor over a link provided in the email message, thereby resulting in an informational message to be displayed.

FIG. 5 shows the same message as the user hovers the mouse pointer 501 over the link 402. The act of hovering has caused an informational message 502 to be displayed.

Figure 6:
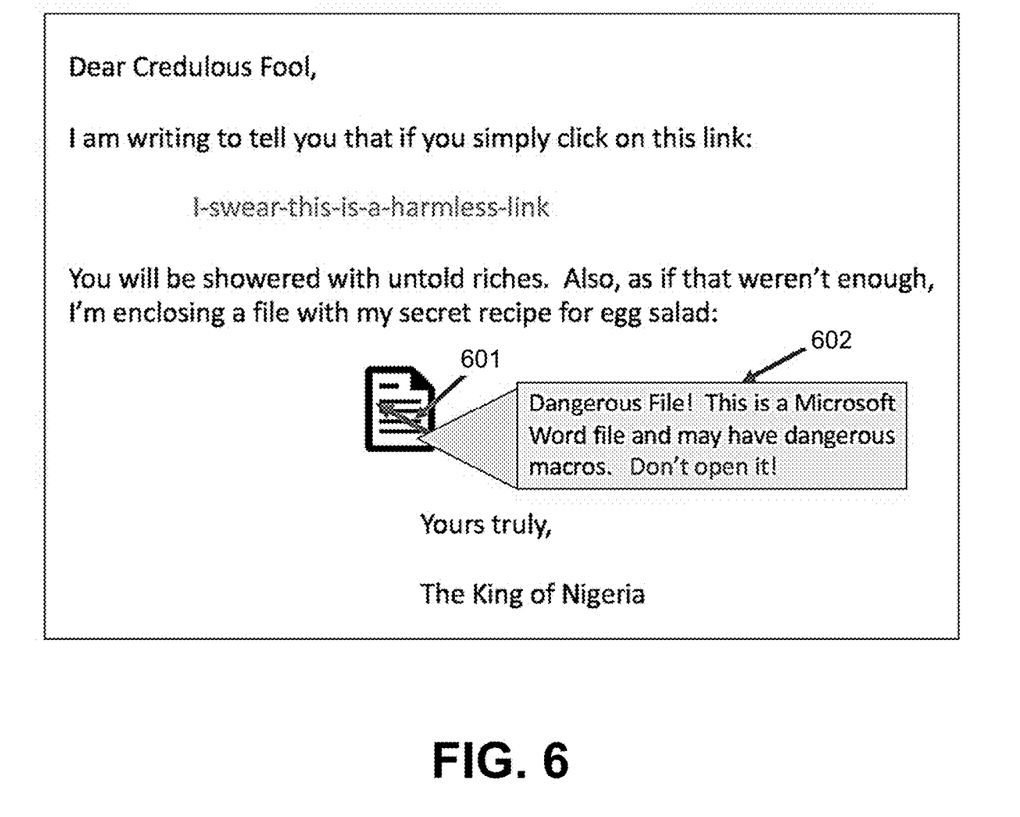
FIG. 6 illustrates a hover event in which the user hovers a mouse cursor over an attachment icon provided in the email message, thereby resulting in an informational message to be displayed.

FIG. 6 shows the same message as the user hovers the mouse pointer 601 over the attachment 403. The act of hovering has caused an informational message 602 to be displayed.

In some embodiments, the information associated with the information resource comprises a safety assessment of the information resource. For example, the safety assessment may generally include an indication whether the information resource contains viruses or other malware. In some embodiments, the safety assessment may include an indication whether a claimed provenance or authorship of the information resource appears to be valid. Accordingly, the safety assessment of the information resource may further include an indication of whether the information resource is safe or potentially harmful if selected and viewed from a security standpoint. As such, the information associated with the information resource may further comprise a recommended action that the user take based on the safety assessment. In other words, the user may be advised to not click on the link, icon, or other visual representation associated with the information resource and may further be advised to contact their IT department or the like.

In some embodiments, the information associated with the information resource informs the user of whether the information resource is an executable program for a platform other than a platform associated with the computing device and in use. In some embodiments, the information associated with the information resource informs the user of whether the information resource comprises adult-oriented material. In some embodiments, the visual representation is a link and the information associated with the information resource indicates whether the link redirects to a different link. In some embodiments, the information associated with the information resource informs the user of whether the information resource comprises material distributed without legal permission. For example, the information may inform the user of whether the information resource comprises copyright violations. In some embodiments, the information associated with the information resource informs the user of whether the information resource comprises sensitive information that the user should not view, wherein the sensitive information comprises at least one of health care information and national security information. In some embodiments, the information associated with the information resource informs the user of whether the information resource is forbidden by a policy of the user's employer.

Figure 7A:
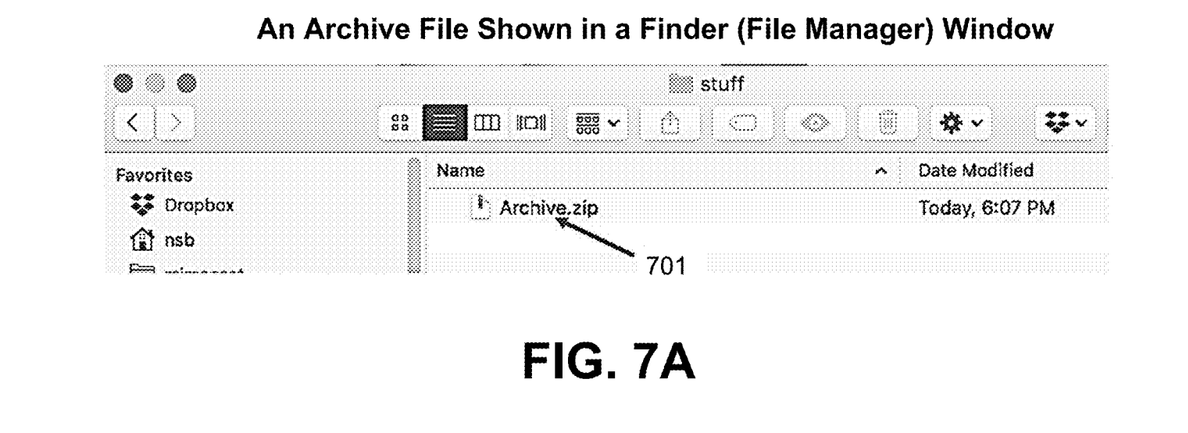
FIG. 7A illustrates and an archive file in a Finder (file manager) window of a user interface and FIG. 7B illustrates a hover event in which the user hovers a mouse cursor over the archive file, thereby resulting in an informational message to be displayed.
Figure 7B:
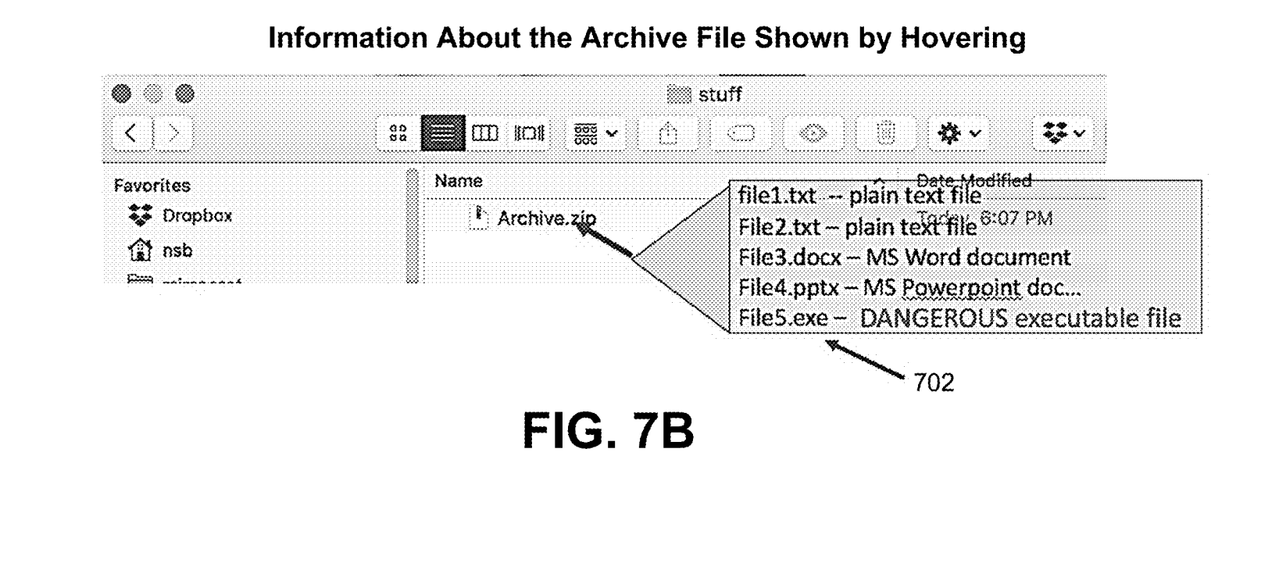

Yet still, in some embodiments, the information associated with the information resource comprises a listing of contents of a multipart information resource. The multipart information resource may include a file archive, for example. For example, FIG. 7A shows an archive file 401 in a Finder (file manager) window. FIG. 7B shows the same archive file, wherein the act of a user hovering the mouse cursor over the archive file 401 results in the presentation of an informational message 402 (in the form of a pop-up icon), which includes information related to the archive file. In this example, the information includes a listing of the archive file's contents. However, it should be noted that in other embodiments, a multitude of information can be displayed, as previously described herein.

Figure 8:
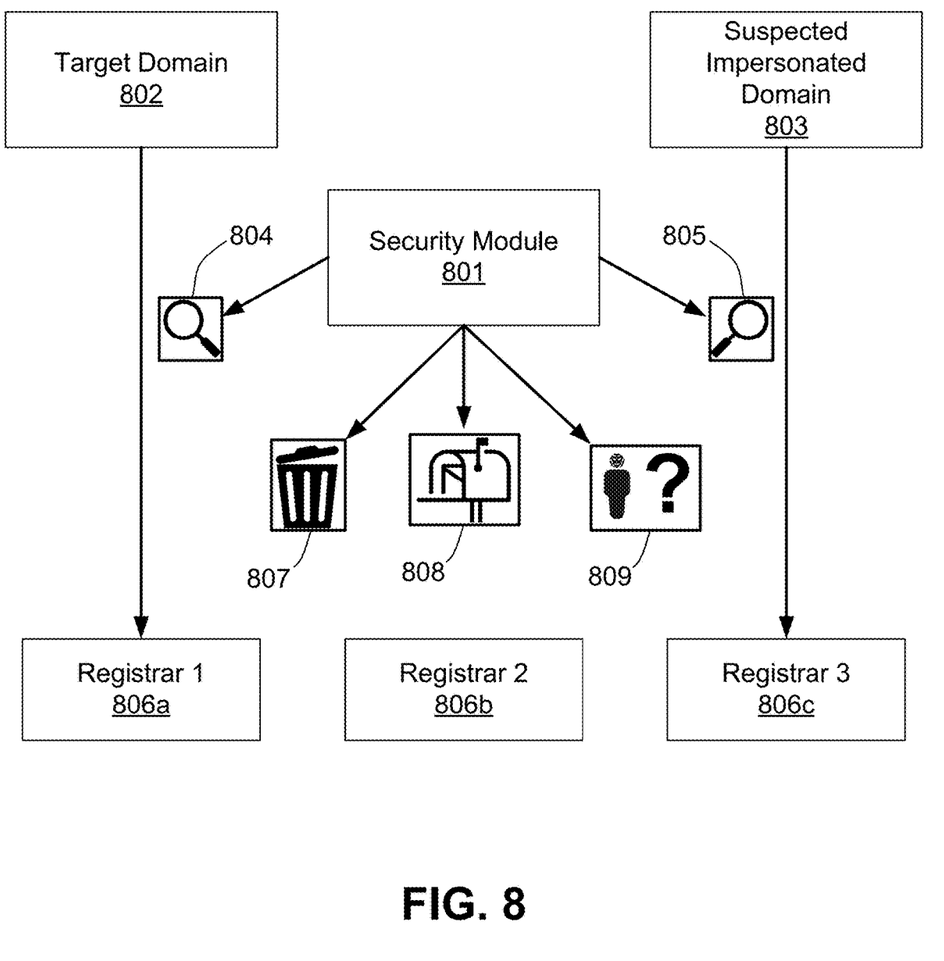
FIG. 8 is a block diagram illustrating various components of one embodiment of a security system of the present disclosure, including a security module for analyzing an email message, specifically determining a correlation between the domain of the email message under inspection and a well-known target domain (e.g., trusted domain) in order to further determine the legitimacy of the email message under inspection.

FIG. 8 is a block diagram illustrating various components of the security system of the present disclosure, including a security module 801 for analyzing an email message, specifically determining a correlation between the domain of the email message under inspection and a well-known target domain (e.g., trusted domain) in order to further determine the legitimacy of the email message under inspection.

As generally understood, domain names serve to identify Internet resources, such as computers, networks, and services, with a text-based label that is easier to memorize than the numerical addresses used in the Internet protocols. A domain name may represent entire collections of such resources or individual instances. Individual Internet host computers may use domain names as host identifiers, also called host names. The term host name is also used for the leaf labels in the domain name system, usually without further subordinate domain name space. Host names appear as a component in Uniform Resource Locators (URLs) for Internet resources such as websites. Domain names are also used as simple identification labels to indicate ownership or control of a resource. Such examples are the realm identifiers used in the Session Initiation Protocol (SIP), the DKIM Domain Keys used to verify DNS domains in e-mail systems, and in many other Uniform Resource Identifiers (URIs).

Domain names are formed by the rules and procedures of the Domain Name System (DNS). Any name registered in the DNS is a domain name. Domain names are used in various networking contexts and for application-specific naming and addressing purposes. In general, a domain name represents an Internet Protocol (IP) resource, such as a personal computer used to access the Internet, a server computer hosting a website, or the website itself or any other service communicated via the Internet.

An important function of domain names is to provide easily recognizable and memorable names to numerically addressed Internet resources. This abstraction allows any resource to be moved to a different physical location in the address topology of the network, globally or locally in an intranet. Such a move usually requires changing the IP address of a resource and the corresponding translation of this IP address to and from its domain name. Domain names are used to establish a unique identity. Entities, such as organizations, can choose a domain name that corresponds to their name, helping Internet users to reach them easily.

Malicious actors on the Internet often try to fool users into thinking that they are interacting with known, trusted entities. When a malicious actor garners some amount of trust from the user, such trust may be exploited to the detriment of the user. For example, domain name impersonation or masquerading is a technique in which a domain name of a trusted entity, which would normally direct to a legitimate and trusted Web page or content, has been altered in such a manner that an internet user can be fooled into believing that the altered domain name is associated with the trusted entity. However, clicking the altered domain name may instead cause downloading of software (or allow other forms of entry) that is of malicious intent, such as phishing, online viruses, Trojan horses, worms, and the like.

For example, a domain name may be altered by one or more characters, but may still visually appear to be associated with the trusted party, thereby tricking an internet user into believing that it is authentic. A user is more likely to click on an altered link if said user believes that the link is associated with a trusted party. For example, the domain name "www.citibank.com" may be altered by one or more characters to form a masquerading domain name, such as "www.cit1bank.com", and may invite trust from a customer of the trusted party (i.e., Citibank), despite the change of the "i" to a "1" in the domain name. Similarly, email falsely purporting to be from Mimecast (the trusted company) will be more believable with a return address of "@mrncast-.com", than with a generic "@yahoo.com". Additionally, a masquerading domain name may use the correct characters or word of the trusted domain name, but may include such characters or words in a different order, such as, for example, "mimecast.nl", "mime-cast.com", "mimecast-labs.com", or "mimecast.x.com", each of which is not registered or associated with the trusted entity. The detection of such subtleties in domain names can be especially difficult, thereby presenting a challenge for current security systems.

Some security systems may utilize current techniques to deal with domain name security issues, such as, for example, blacklists, whitelists, and loose matching of domain names to a list of trusted domains. Known systems and methods generally check for domain name impersonation by way of seeking visual similarities between a domain name in question and a known list of trusted domain names, which is particularly useful in identifying domain names that have been altered by way of deceptive character use. For example, as previously noted, some masquerading domain names include a majority of characters from a normally trusted domain name, while some of the characters have been altered, such that the masquerading domain name as a whole visually appears to be associated with the trusted party.

The introduction of Unicode domain names, however, has made the task of detecting of masquerading domain names increasingly more difficult, particularly for security systems that rely on visual comparisons. Unicode is a computing industry standard for the consistent encoding, representation, and handling of text expressed in most of the world's writing systems. Unicode domains can be problematic because many Unicode characters are difficult to distinguish from common ASCII characters. Unicode domains has led to homograph and homoglyph attacks. In particular, it is possible for a malicious actor register domains such as "xn-pple-43d.com", which when displayed is visually equivalent to "apple.com", in an attempt to fool a user into clicking on the masquerading domain name. A homograph attack is a method of deception wherein a threat actor leverages on the similarities of character scripts to create and register phony domains of existing ones to fool users and lure them into visiting. This attack has some known aliases: homoglyph attack, script spoofing, and homograph domain name spoofing. Characters—i.e., letters and numbers—that look alike are called homoglyphs or homographs, thus the name of the attack. Examples of such are the Latin small letter "o" (U+006F) and the Digit zero "o" (U+0030). Furthermore, current security systems relying on visual similarity techniques have difficulty in detecting masquerading domain names that may use the correct characters or words of the trusted domain name in the wrong order or placement of the domain.

As previously described, the system 10 may be configured to provide improved domain name authentication by analyzing a domain associated with a hyperlink included in a message received by a user. The message may be an email message from a sender to one or more email recipients. The system 10 is configured to analyze a domain associated with the hyperlink within the email message, upon detecting a hover or mouseover event, in order to determine whether the domain is authentic and associated with a trusted entity or party (i.e., determine legitimacy of the domain to ensure that said email message does not contain a threat).

FIG. 3 generally illustrates a decision module based on inspection of domain registrar information with a security module 801 comparing the domain of a link within an email message being examined (referred to as the "suspect domain") with a well-known target domain. It should be noted that, as an initial step, the system is configured to compare the suspect domain with a plurality of known and trusted domains (i.e., "target domains"). The system is further configured to determine a level of resemblance between the suspect domain and one or more of the trusted domains based on the comparison. In the event that there is a positive level of resemblance between the domain name and one or more of the plurality of trusted domains, then analysis of the suspect domain name begins. Accordingly, rather than analyze metadata between the suspect domain and all of the trusted domains, which can be somewhat time consuming, the system of the present disclosure performs an initial review of the suspect domain and the plurality of trusted domains to identify potential trusted domain candidates, at which point the deeper analysis, involving comparison of metadata, between the suspect domain and trusted domain matches can take place.

Both the target domain(s) 802 and the suspect domain 803, by necessity, register certain information, specifically DNS metadata 804, 805, respectively, with a domain registrar 806a, 806b, 806c. If the suspect is a poor match with the target domain, the domain and associated message are flagged as being highly suspect. After examining the domains, the security module 801 is configured to either flag the message 807 as containing a questionable link and thereby advise the user that it poses a potential threat, flag the message 808 as being safe and containing a safe link and thereby advise the user that it does not pose a potential threat, or flags the message for further study 209.

Signs of masquerading domains can include any of the network configuration information that users generally don't see, including the WHOIS database, the ISP in use, the country in which the server resides (for companies that aren't highly international), inconsistencies in the information available from the nameserver (e.g. DKIM or SPF information) and more. Any of these can be used as clues to flag a potentially masquerading domain.

Accordingly, the system is configured to analyze most, if not all, DNS metadata provided by the DNS system for a given domain under inspection, including, but not limited to, the registrar of the domain, the IP addresses of Mail Exchanger (MX) records, DomainKeys Identified Mail (DKIM) records, and other service addresses beyond Simple Mail Transfer Protocol (SMTP), Internet Message Access Protocol (IMAP), and Post Office Protocol (POP). The system is further configured to utilize other data associated with the domain name under inspection, such as behavioral attributes of the trusted entity or party, including, but not limited to, server software in use and policies the entity or party enforces. For example, WHOIS, the query and response protocol, may be widely used for querying databases that store the registered users or assignees of an Internet resource, such as a domain name, an IP address block or an autonomous system.

The security system of the present disclosure is configured to proactively inform a user about potential security threats associated with a clickable object prior to the user selecting the object and risking harm to their computing device and network. As such, in the event that harmful content slips past filters at the time of delivery (e.g., email), the security system of the present disclosure provides an additional layer of security configured to inform a user of the potentially harmful content, in advance of the user interacting with such content (i.e., selecting the clickable link or icon so as to view, activate, open, or download the content).

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry.

Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A system for proactively providing a user with information associated with an information resource in advance of user selection and viewing of the information resource, the system comprising:

a processor coupled to a memory containing instructions executable by the processor to cause the system to:

monitor user interaction with a user interface of a computing device displaying content;

detect a hover event corresponding to user input with the user interface, the user input comprising positioning of a selection input proximate to a visual representation of an information resource for a predetermined period of time;

analyze one or more underlying artifacts associated with the information resource; and output to the user, via the user interface, information associated with the information resource based on the analysis of the one or more underlying artifacts, wherein the visual representation of the information resource is a selectable object associated with a domain; and wherein analyzing the one or more underlying artifacts associated with the information resource comprises analyzing the domain associated with the selectable object, such analyzing comprising:

comparing the domain with a plurality of trusted domains;

correlating metadata of the domain with metadata of at least one trusted domain if the domain is determined to be similar to at least one of the trusted domains; and flagging the domain as being legitimate or flagging the domain as being illegitimate based on the correlation, wherein the domain is flagged as being legitimate based on a positive correlation and the domain is flagged as being illegitimate based on a negative correlation.

2. The system of claim 1, wherein outputting the information comprises displaying, on the user interface, a pop-up icon providing information associated with the information resource.

3. The system of claim 1, wherein the information associated with the information resource comprises a safety assessment of the information resource.

4. The system of claim 3, wherein the safety assessment of the information resource comprises an indication of whether the information resource is safe or potentially harmful if selected and viewed from a security standpoint.

5. The system of claim 4, wherein the information associated with the information resource further comprises a recommended action that the user take based on the safety assessment.

6. The system of claim 4, wherein the safety assessment comprises an indication whether the information resource contains viruses or other malware.

7. The system of claim 4, wherein the safety assessment comprises an indication whether a claimed provenance or authorship of the information resource appears to be valid.

8. The system of claim 1, wherein the information associated with the information resource informs the user of whether the information resource is an executable program for a platform other than a platform associated with the computing device and in use.

9. The system of claim 1, wherein the information associated with the information resource comprises a listing of contents of a multipart information resource.

10. The system of claim 9, wherein the multipart information resource is a file archive.

11. The system of claim 1, wherein the information associated with the information resource informs the user of whether the information resource comprises adult-oriented material.

12. The system of claim 1, wherein the visual representation is a link and the information associated with the information resource indicates whether the link redirects to a different link.

13. The system of claim 1, wherein the information associated with the information resource informs the user of whether the information resource comprises material distributed without legal permission.

14. The system of claim 13, wherein the information informs the user of whether the information resource comprises copyright violations.

15. The system of claim 1, wherein the information associated with the information resource informs the user of whether the information resource comprises sensitive information that the user should not view, wherein the sensitive information comprises at least one of health care information and national security information.

16. The system of claim 1, wherein the information associated with the information resource informs the user of whether the information resource is forbidden by a policy of the user's employer.

17. The system of claim 1, wherein the visual representation of the information resource is a selectable object comprising a link, an icon, an attachment, or other visual representation of an information resource.

18. The system of claim 1, wherein the visual representation is an email address, and the information associated with the information resource comprises one or more aspects of a reputation of the email address.

19. The system of claim 1, wherein the system is further configured to maintain a database with the plurality of trusted domains.

20. The system of claim 1, wherein the metadata is stored in a domain name system (DNS).

21. The system of claim 1, wherein the metadata comprises at least one of a Mail Exchanger (MX) record, a Sender Policy Framework (SPF) record, or a DomainKeys Identified Mail (DKIM) record.

* * * * *